United States Patent
Way et al.

(10) Patent No.: US 6,229,606 B1
(45) Date of Patent: May 8, 2001

(54) METHOD AND APPARATUS FOR MEASURING PMD OF A DISPERSION COMPENSATION GRATING

(75) Inventors: David Way, Garland; Tiejun Xia, Richardson, both of TX (US)

(73) Assignee: MCI WorldCom, Inc., Washington, DC (US)

(*) Notice: Subject to any disclaimer, the term of this patent is extended or adjusted under 35 U.S.C. 154(b) by 0 days.

(21) Appl. No.: 09/415,348

(22) Filed: Oct. 8, 1999

(51) Int. Cl.[7] .............................. G01J 4/00; H04B 10/00
(52) U.S. Cl. .................... 356/364; 359/161; 359/135; 359/249
(58) Field of Search ................ 356/364; 359/161, 359/122, 156, 158, 177, 183, 135, 249

(56) References Cited

U.S. PATENT DOCUMENTS

| | | |
|---|---|---|
| 5,227,623 | 7/1993 | Heffner . |
| 5,298,972 | 3/1994 | Heffner . |
| 5,587,827 * | 12/1996 | Hakimi et al. .................. 359/249 |
| 5,831,752 * | 11/1998 | Cotter et al. ................... 359/135 |
| 6,104,515 * | 8/2000 | Cao ................................. 359/161 |
| 6,130,766 * | 10/2000 | Cao ................................. 359/161 |

OTHER PUBLICATIONS

Automated Measurement of Polarization Mode Dispersion Using Jones Matrix Eigenanalysis By: B. L. Heffner—Sep. 3, 1992; IEE Photonic Letters, vol. 4, No. 9, Sep. 1992.
NonLinear Fiber Optics by Govind P. Agrawal; pp. 8–9.

* cited by examiner

Primary Examiner—Frank G. Font
Assistant Examiner—Roy M. Punnoose

(57) ABSTRACT

A method, a system and a computer program product configured to determine a differential group delay of two sequential optical beams based on a frequency dependence of a length of an optical path traveled by the two sequential optical beams in a dispersion compensation grating. The determined differential group delay provides a measure of polarization mode dispersion in the dispersion compensation grating.

18 Claims, 3 Drawing Sheets

METHOD AND APPARATUS FOR MEASURING PMD OF A DISPERSION COMPENSATION GRATING

BACKGROUND OF THE INVENTION

1. Field of the Invention

The present invention relates to electronic instruments for testing optical devices, and in particular to a method and apparatus for measuring polarization mode dispersion (PMD) of a dispersion grating, such as a dispersion compensation grating (DCG).

2. Description of the Related Art

As a light pulse, with a finite spectrum of optical frequencies, travels through a medium, e.g., an optical fiber, two dispersion phenomena occur. First, because light travels through the medium at different velocities depending on its frequency, the pulse of multiple frequency will experience a chromatic dispersion and will be spread out in time during its propagation through the medium. Second, a polarization mode dispersion (PMD) occurs because light travels through the medium at different velocities depending on its polarization. It is well known that PMD can limit the available transmission bandwidth in fiber optics transmission links. In other words, as the bit rate of a system increases, the PMD tolerance of that system decreases.

To minimize the chromatic dispersion in high bit rate systems (for example, a OC-48 system having a 2.488 Gbps bit rate) it has been suggested to connect the optical fiber to a dispersion compensation grating (DCG). Such DCG is specifically designed to compensate for chromatic dispersion. However, a DCG may potentially increase PMD in the optical fiber/DCG system, and thus, may deteriorate transmission in high bit rate systems. There is, therefore, a need for a method and apparatus capable of accurately measuring PMD of a DCG so as to determine whether a particular DCG can be incorporated into a high bit rate optical fiber system without deterioration of the optical signal.

Several conventional methods exist to measure PMD in optical fibers. In particular, a well-established method for measuring PMD in optical fibers uses the so-called "Jones Matrix Eigenanalysis" (JME). A description of this method is provided for example in U.S. Pat. Nos. 5,227,623 and 5,298,972 to Hefner and in B. L. Hefflier, "Automated Measurement of Polarization Mode Dispersion Using Jones Matrix Eigenanalysis", IEEE Photonics Technology Letters, Vol. 4, No. 9, September 1992, the entire contents of which are hereby incorporated by reference.

An example of an apparatus used in the conventional JME method to measure PMD in an optical fiber is shown in FIG. 1. An optical source 10, which may be a conventional tunable laser source, generates sequential optical beams with different frequencies/wavelengths, for example 1300 nm and 1302 nm. The polarization synthesizer 20 receives the optical beams from the optical source 10 and produces three sequential states of polarization for each optical beam. Preferably, the three states of polarization are separated by 60°. The polarized optical beams travel sequentially though the optical fiber 30 under test, which produces the PMD being measured. The optical beams, having experienced PMD through the optical fiber, then enter an analyzer 40, such as an optical polarization meter. Optical polarization meter 40 measures the intensity of the received optical beams with the different polarizations and generates the so called "Stokes parameters," which are well known in the art and defined in *Principles of Optics*, by M. Born and E. Wolf, Pergamon Press, 4$^{th}$ Edition, London, 1970, pages 30–32, the content of which is hereby incorporated by reference. For each optical beam with a particular wavelength, the Jones matrices are then computed in processor 50 from the measured responses, i.e., from the Stokes parameters, according to a known algorithm. One such algorithm is described in U.S. Pat. No. 5,298,972, the entire content of which is hereby incorporated by reference.

Processor 50 may be a conventional personal computer and can be connected to the optical source 10 to read and set the frequency of the optical beams. Processor 50 is also connected to polarization synthesizer 20 to read and set the polarization of the optical beams. Once the Jones matrices, which capture the characteristics of the optical fiber under test, are determined, then PMD can be determined using a conventional Jones Matrix Eigenanalysis, which is well known to persons of ordinary skill in the art, described for example in U.S. Pat. No. 5,227,623 at column 12, line 21 to column 16, line 21, the entire content of which is incorporated herewith by reference.

Briefly summarizing, the conventional Jones Matrix Eigenanalysis method for measuring PMD in an optical fiber, defines the following quantities:

$E_1(\omega)$ is the input field of an optical beam of frequency $\omega$ before entering an optical fiber. $E_1(\omega)$ has a unit vector $\hat{e}_1$.

$E_2(\omega)$ is the output field of an optical beam of frequency $\omega$ after exiting the optical fiber. $E_2(\omega)$ has a unit vector $\hat{e}_2$.

$T(\omega)$ is the Jones matrix, characteristic of the optical fiber, so that $$E_2(\omega)=T(\omega)\cdot\hat{e}_1. \tag{1}$$

The output field $E_2(\omega)$ can be expressed in terms of a magnitude term $\sigma(\omega)$ and a phase conponent $\phi(\omega)$:

$$E_2(\omega)=\sigma(\omega)\, e^{i\phi(\omega)}\hat{e}_2. \tag{2}$$

Taking the partial derivative of $E_2(\omega)$ with respect to $\omega$, and using the prime symbol to denote differentiation with respect to $\omega$, one obtains:

$$E'_2(\omega)=T'(\omega)\cdot\hat{e}_1=(\sigma'(\omega)/\sigma(\omega)+i\phi'(\omega))E_2(\omega), \tag{3}$$

where $\delta\hat{e}_1/\delta\omega=0$ because $\hat{e}_1$ is fixed at input and $\delta\hat{e}_2/\delta\omega$ is 0 to first order over $\omega$. From Equation (1) and assuming that the optical fiber is not perfectly polarizing so that its Jones matrix is non-singular, one obtains:

$$\hat{e}_1=T^{-1}(\omega)\cdot E_2(\omega). \tag{4}$$

Inserting (4) into (3) and using the approximation $T'(\omega)=[T(\omega+\Delta\omega)-T(\omega)]/\Delta\omega$, one obtains:

$$[T(\omega+\Delta\omega)-T(\omega)]/\Delta\omega\cdot T^{-1}(\omega)\cdot E_2(\omega)=(\sigma'(\omega)/\sigma(\omega)+i\phi'(\omega))E_2(\omega),$$

which simplifies to:

$$T(\omega+\Delta\omega)\cdot T^{-1}(\omega)-(1+i\phi'(\omega)\Delta\omega)I=0, \tag{5}$$

where I is the unit matrix, and where it is assumed that $\Delta\omega\cdot\sigma'(\omega)/\sigma(\omega)$ is 0 for small $\Delta\omega$ because losses are essentially the same at $\omega$ and at $\omega+\Delta\omega$.

For an optical fiber, it is assumed that the phase component of the output field, $\phi(\omega)$, is the product of a propagation constant, $\beta$ which is a function of frequency, times the distance z traveled by the light beam along the axis of the optical fiber. For an optical fiber, it is assumed that z is independent of frequency, so that:

$\phi(\omega)=\beta(\omega)\cdot z$, and $\phi'(\omega)=\delta\beta(\omega)/\delta\omega\cdot z$.

$\delta\beta(\omega)/\delta(\omega)$ is the reciprocal of the group velocity $v_g$, so that $$\phi'(\omega)=z/v_g=\tau_g, \qquad (6)$$

where $\tau_g$ is the group delay of the optical beam through the optical fiber. Substituting (6) into (5) and solving (5) for the eigenvalues gives:

$$\Delta\tau=\tau_{g,I}-\tau_{g,II}=\text{Arg}(\rho_I/\rho_{II})/\Delta\omega, \qquad (7)$$

where I and II denote the two principal states of polarization; $\rho_I$ and $\rho_{II}$ are the eigenvalues of $T(\omega+\Delta\omega)\cdot T^{-1}(\omega)$; Arg denotes the argument function; and $\Delta\tau$, which is called the differential group delay, corresponds to the PMD in the optical fiber. The computation of $\Delta\tau$ is performed by processor 50, which is configured to carry out the above analysis based on the data received from optical polarization meter 40.

As noted above, the conventional JME method asssumes that the length of the traveled optical path by light, z, is independent of frequency, so that AT corresponds exclusively to the effect of PMD. This is an accurate assumption in optical fibers, and JME is thus an accurate method for measuring PMD in optical fibers.

However, in a DCG, by definition, the length of the optical path traveled by light, z, is dependent of frequency, i.e., $z=z(\omega)$. Specifically, light is reflected off a DCG at a depth that is dependent of its frequency. The DCG is designed so that the difference in travel time for different wavelengths caused by the difference in length of the optical path traveled by the light of different wavelength offsets, or compensates for, the difference in traveled time caused by the chromatic dispersion. Consequently, in a DCG, light of different wavelengths will have different lengths of traveled optical path and the JME assumption noted above is no longer correct. Thus, if the conventional JME method were to be used to measure PMD of a DCG, the computed differential group delay, $\Delta\tau$, would not correspond to the true PMD of the DCG, but to the sum of the delay caused by PMD plus any delay caused by the difference in length of the traveled optical path in the DCG. Therefore, using the conventional JME method for measuring PMD in a DCG does not give an accurate result.

SUMMARY OF THE INVENTION

Accordingly, an object of the present invention is to provide a method and apparatus to accurately measure PMD in a DCG.

A second object of the present invention is to provide a modified JME method and an apparatus to implement such a modified JME method, which takes into consideration the frequency dependence of the length of the traveled optical path in the DCG when determining the PMD of a DCG.

In a first embodiment, the present invention provides a method for determining polarization mode dispersion (PMD) of a DCG, including generating two sequential optical beams of different frequencies; exposing the grating to the two sequential optical beams; determining a differential group delay of the two sequential optical beams based on a frequency dependence of a length of an optical path traveled by the two sequential optical beams in the DCG.

A preferred emodiment of the present invention includes determining the Jones matrix of the DCG using the Stokes parameters of the DCG.

Another preferred embodiment of the present invention includes determining the eigenvalues of the equation:

$$T(\omega+\Delta\omega)\cdot T^{-1}(\omega)-(1+i\phi'(\omega)\Delta\omega)I=0,$$

where T is the Jones matrix of the DCG, $\omega$ is an optical beam frequency variable, $\Delta(\omega)$ is a frequency difference between the two sequential optical beams traveling through the DCG, I is the unit matrix, and $\phi'(\omega)$ is the partial derivative, with respect to $\omega$, of a phase component of a field output from the DCG, wherein $$\phi'(\omega)=\tau_g+\beta(\omega)\cdot\delta z(\omega)/\delta\omega,$$

where $\tau_g$ is a group delay due to PMD, $\beta(\omega)$ is the propagation constant of the DCG and z is a variable representing the traveled length of the optical path.

Another preferred embodiment of the present invention includes determining the differential group delay, $\Delta\tau$, by calculating:

$$\Delta\tau=\text{Arg}(\rho_I/\rho_{II})/\Delta\omega-(\beta_I-\beta_{II})\cdot\delta z(\omega)/\delta\omega,$$

where Arg denotes the argument function, $\rho_I$ and $\rho_{II}$ are the eigenvalues of $T(\omega+\Delta\omega)\cdot T^{-1}(\omega)$, and $\beta_I$ and $\beta_{II}$ are the two propagation constants on the two principal axes of PMD. Another preferred embodiment of the present invention includes determining the differential group delay, $\Delta\tau$, by calculating:

$$\Delta\tau=\{\text{Arg}(\rho_I/\rho_{II})/\Delta\omega\}/(1-\lambda Dc/2L_\lambda),$$

where $\lambda$ is the average optical beam wavelength between the two sequencial optical beams, c is the speed of light, D is the dispersion value of the DCG, and $L_\lambda$ is a distance from the entrance of the DCG to a plane reflecting an optical beam of wavelength $\lambda$.

In accordance with another embodiment, the present invention provides a system to implement the above method.

In yet another embodiment, the present invention provides a computer program product to implement the above method.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
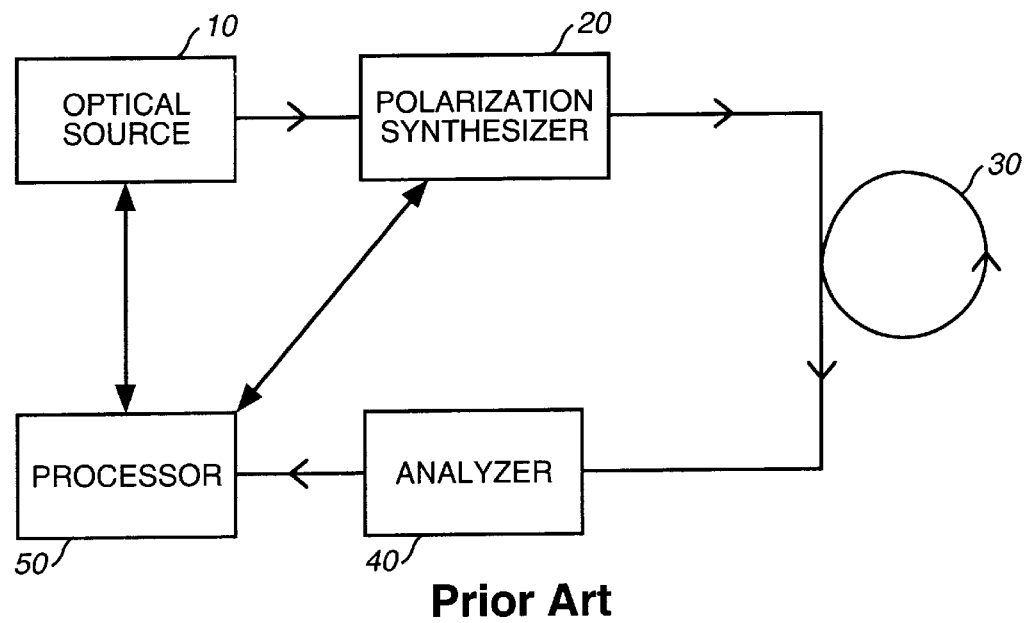
FIG. 1 is a block diagram of a conventional JME apparatus.

Referring now to the drawings, wherein like reference numerals designate identical or corresponding parts throughout the several views, a first embodiment of the present invention in the form of an apparatus for measuring the PMD of a DCG (as shown in the block diagram of FIG. 2) is described.

Figure 2:
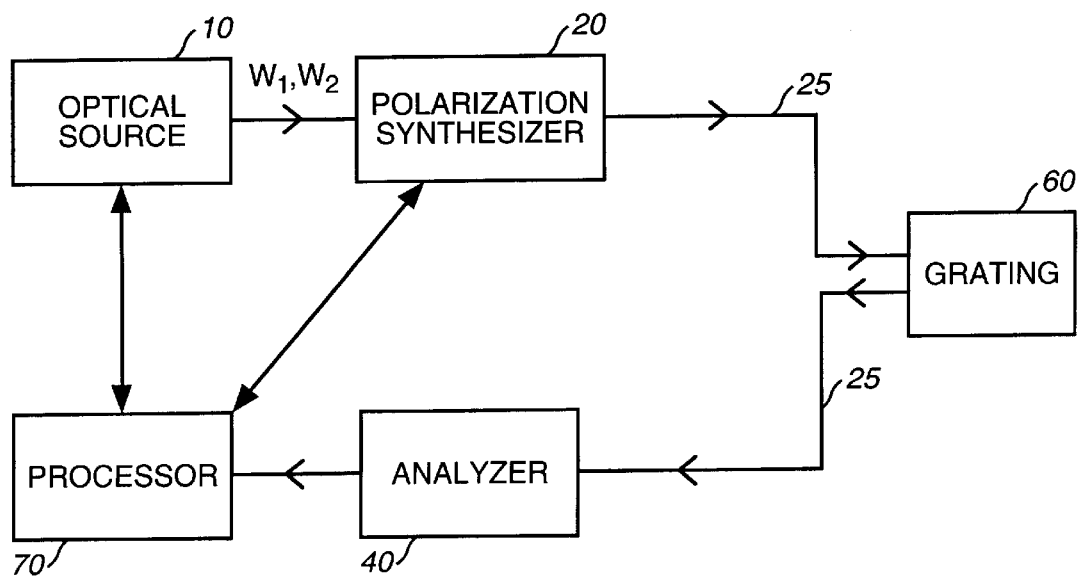
FIG. 2 is a block diagram of a modified JME apparatus to measure MPD in a DCG according to the present invention.

In FIG. 2, optical source 10 generates at least two sequential optical beams with different frequencies. Polarization synthesizer 20 sets the polarization of the beams; in an exemplary embodiment, the separation is by 45°. The polarized optical beams travel through grating 60 and then enter polarization meter 40, which detects the beams' polarization. Data from polarization meter 40 is then read by processor 70, which controls and reads both optical source 10 and polarization synthesizer 20. To minimize introduction of any PMD from the hardware components other than the grating 60, polarization-maintaining fibers 25 are used to connect the grating 60 to the rest of the hardware.

Some of the components used in the present invention for measuring the PMD of a DCG can be the same as the ones used for measuring the PMD of an optical fiber. In particular, optical source 10, polarization synthesizer 20 and polarization meter 40, of the conventional system as in FIG. 1 can be employed in an embodiment of the present invention. The commonality of components is advantageous because it allows persons of ordinary skill in the art, who are already familiar with these components, to implement the present invention without having to purchase and familiarize themselves with many new components. The present invention is therefore practical and cost-effective to persons working in the field.

Alternatively, optical source 10 can be a tunable laser source, such as HP8167A manufactured by Hewlett-Packard™, polarization synthesizer 20 and optical polarization meter 40 can be part of a single unit polarization analyzer, such as HP8509B, manufactured by Hewlett-Packard™.

The device being tested in FIG. 2 is grating 60, and the data from optical polarization meter 40 is received by processor 70, which is configured to perform the analysis described below in order to determine the PMD of grating 60. Grating 60 can be any grating. However, when the present invention is used to determine the PMD of gratings used with optical fibers to compensate the chromatic dispersion that occurs in optical fibers, a DCG is used. Therefore, grating 60 is preferably a DCG.

Figure 3:
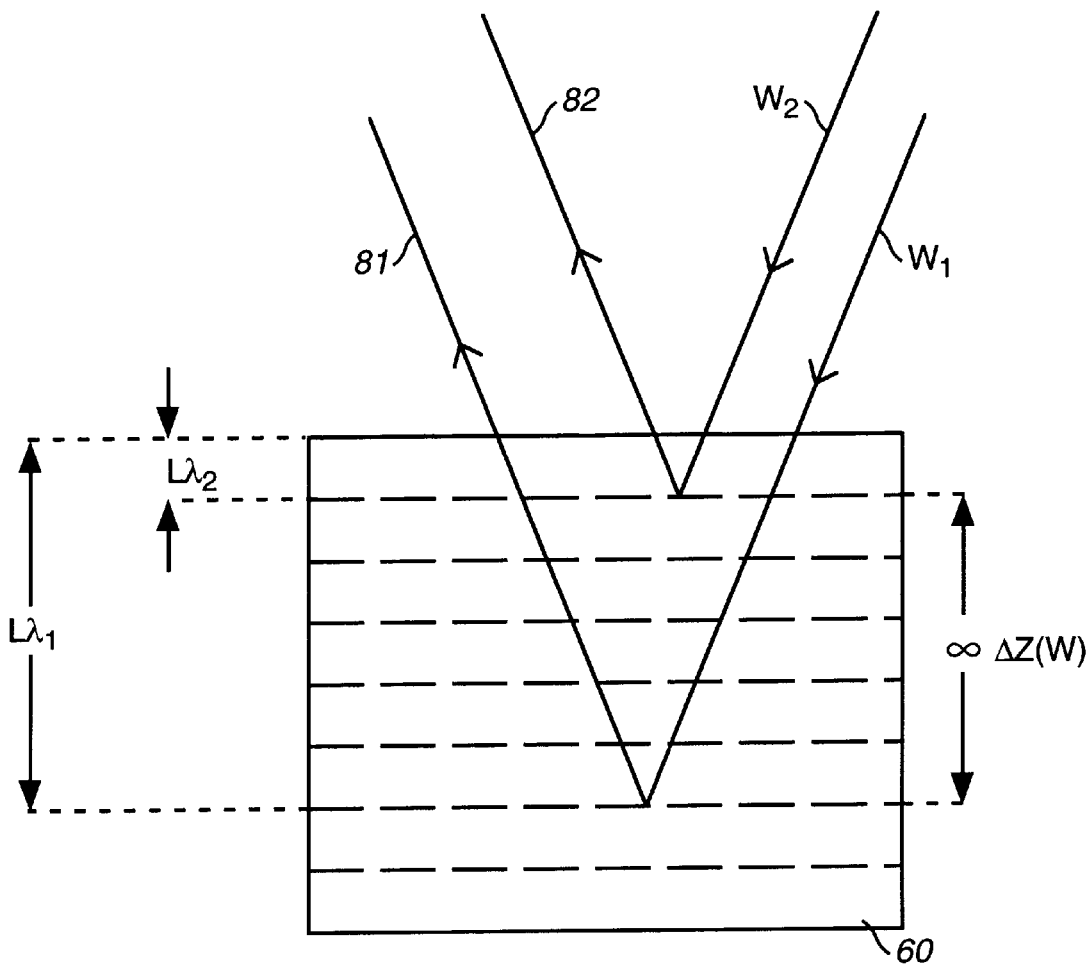
FIG. 3 is a schematic representation of a DCG for which PMD is measured by the apparatus and method of the present invention.

An example of a DCG 60, which may be used in the present invention, is schematically represented in FIG. 3. As mentioned above, a DCG 60 is designed to compensate for chromatic dispersion. Threfore, a DCG 60 is designed so that the traveled length of the optical path depends on the frequency of the optical beam traveling through the grating. For example, in FIG. 3, optical beam 81 having a frequency $\omega_1$ travels a longer optical path than optical beam 82, having frequency $\omega_2$. The difference in traveled length $\Delta z$ is therefore frequency dependent, i.e., $\Delta z = \Delta z(\omega)$.

DCG 60 is typically made by exposing an optical fiber with an intensity modulated X-ray beam. The intensity modulation generates ripples in the optical fiber and a grating is thus created. The intensity modulation can be controlled to obtain different grating characteristics, such as a dispersion compensation grating.

Processor 70 (FIG. 2) may be implemented by a personal computer as well known in the art or any computing device including a memory device connected to a processing unit. Processor 70 receives data from optical polarization meter 40 and then computes Stokes parameters and the Jones matrix for the DCG 60 in a similar manner as described above for a conventional PMD measurement for an optic fiber. However, processor 70, according to the present invention, is configured to compute the PMD of grating 60 based on the analysis below.

As noted above, in a DCG 60, the length of the traveled optical path depends on the frequency of the optical beam. In other words, Equation (6) is not correct for a DCG 60. Instead, one has:

$\phi(\omega)=\beta(\omega)\cdot z(\omega)$, so that $\phi'(\omega)=\delta\beta(\omega)/\delta\omega\cdot z(\omega)+\beta(\omega)\cdot\delta z(\omega)\delta\omega$, or $$\phi'(\omega)=\tau_g+\beta(\omega)\cdot z(\omega)/\delta\omega \tag{8}$$

where $\tau_g$ is the group delay due to PMD, and the second term is related to the "designed" delay caused by the DCG 60. Substituting Equation (8) into Equation (5), and solving Equation (5) for the eigenvalues gives:

$$(\tau_{g,I}+\beta_I\cdot\delta z(\omega)/\delta\omega)-(\tau_{g,II}+\beta_{II}\cdot\delta z(\omega)/\delta\omega)=\text{Arg}(\rho_I/\rho_{II})\Delta\omega, \tag{9}$$

where $\rho_I$ and $\rho_{II}$ are the eigenvalues of $T(\omega+\Delta\omega)\cdot T^{-1}(\omega)$, T representing the Jones matrix for the DCG, $\beta_I$ and $\beta_{II}$ are the two propagation constants on the two principal axes of PMD, $\Delta\omega$ is the frequency difference between two sequential optical beams, and Arg denotes the argument function. Solving Equation (9) for $\tau_{g,I}-\tau_{g,II}=\Delta\tau$, the differential group delay, corresponding to the PMD in the DCG 60, gives:

$$\Delta\tau=\tau_{g,I}-\tau_{g,II}=\text{Arg}(\rho_I/\rho_{II})/\Delta\omega-(\beta_I-\beta_{II})\cdot\delta z(\omega)/\delta\omega. \tag{10}$$

where $\beta_{II}$ and $\beta_{II}$ can be expressed as:

$$\beta_I=2\pi n_I/\lambda \text{ and } \beta_{II}=2\pi n_{II}/\lambda, \tag{11}$$

where $n_I$ and $n_{II}$ are the total index of refraction for the grating material for the first and second principle states of polarization, respectively, and X is the average optical beam wavelength for two sequential measurements.

In most cases, as shown in G. Agraval, *Nonlinear Fiber Optics*, Academic Press, pp 8–9, the content of which is hereby incorporated by reference, it can be assumed that:

$$n_I \approx n_{II} \approx n_g = c \, \tau_g/L_\lambda, \tag{12}$$

where $n_g$ is the group velocity index, c is the speed of light, $\tau_g$ is the group delay through the DCG, and $L_\lambda$ is the distance from the entrance of the grating to the equivalent plane reflecting the optical beam of wavelength $\lambda$ (see FIG. 3). In practice, $L(\lambda)$, and thus $L_\lambda$, is provided by the grating manufacturer.

Also, $\delta z(\omega)/\delta\omega$ can be expressed as:

$$\delta z(\omega)/\delta\omega=-\lambda^2 D/2\pi, \tag{13}$$

where $\lambda$ is the average optical beam wavelength between two sequencial optical measurements, and D is the dispersion value of the grating, which in practice is also provided by the grating manufacturer.

Replacing (12) into (11), then (11) and (13) into (10) gives:

$$\Delta\tau=\{\text{Arg}(\rho_I/\rho_{II})/\Delta\omega\}/(1-\lambda D \, c/2L_\lambda). \tag{14}$$

Equation (14) therefore gives a practical solution to measuring the differential group delay, i.e., PMD, of a DCG.

As shown in Equation (10), when compared to Equation (7), the present invention provides a method for accurately measuring the PMD of a DCG by taking into consideration the frequency dependence of the length of the traveled optical path in the DCG. This frequency dependence leads to an additional term in the expression of the differential group delay, $\Delta\tau$, when compared to the expression used in the conventional JME method. The present invention thus provides a modified JME method, which can be easily implemented by persons of ordinary skill in the art to accurately determine the PMD of a DCG.

Advantageously, once the PMD of a DCG is determined to be satisfactory, the DCG can be inlcuded in a high bit rate network with confidence. The present invention therefore provides a useful, concrete and tangible result.

All or a portion of the invention may be conveniently implemented using conventional general purpose computers or microprocessors programmed according to the teachings of the present invention, as will be apparent to those skilled in the computer art. Appropriate software can be readily prepared by programmers of ordinary skill based on the teachings of the present disclosure, as will be apparent to those skilled in the software art.

Figure 4:
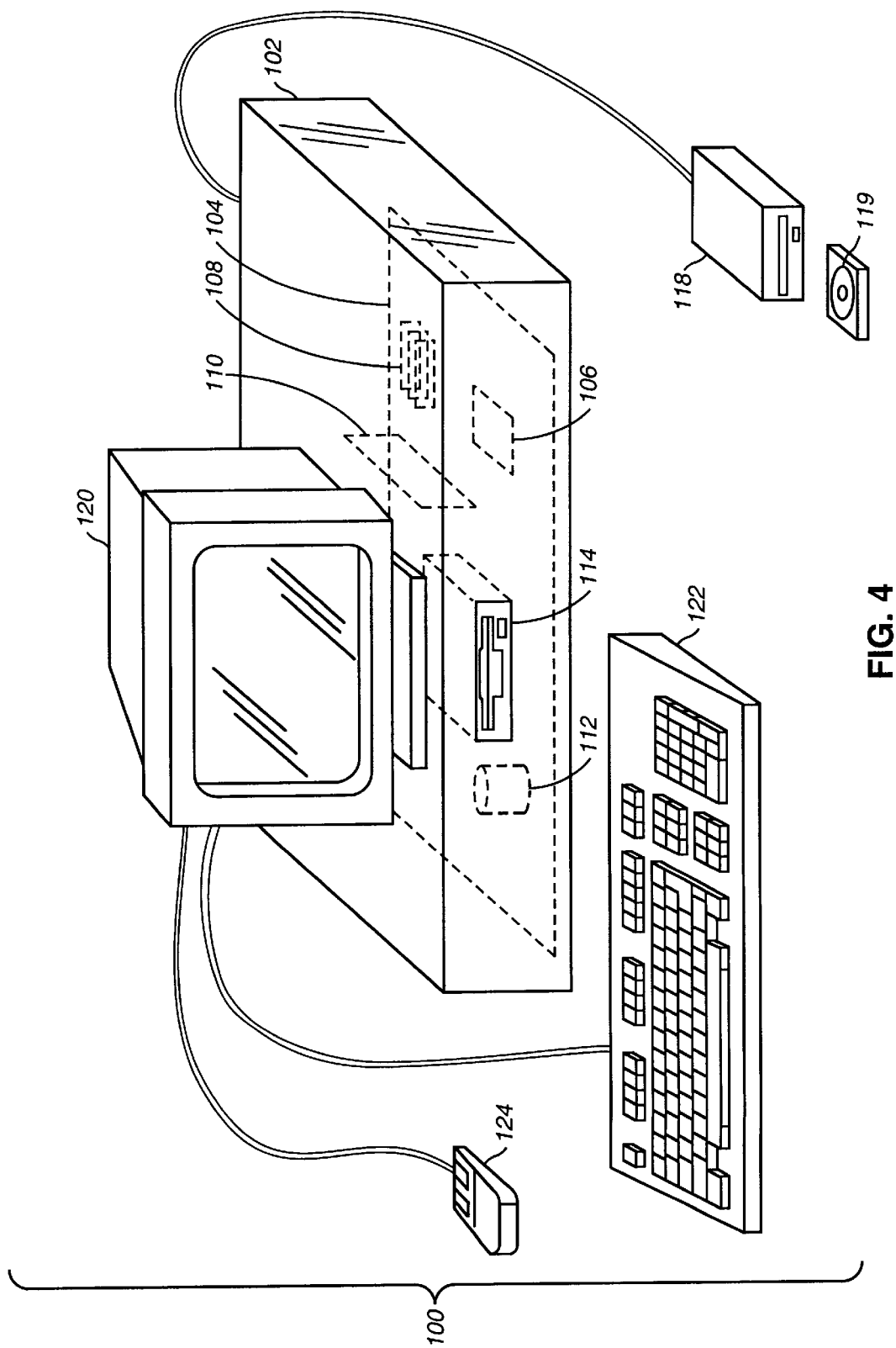
FIG. 4 is a schematic representation of a computer implementing the present invention.

FIG. 4 is a schematic illustration of a computer system 100 for implementing the method of the present invention. The computer system 100 includes a computer housing 102 for housing a mother board 104, which contains a CPU 106, a memory 108 (e.g., random access memory (RAM), dynamic RAM (DRAM), static RAM (SRAM), synchronous DRAM (SDRAM), flash RAM, read-only memory (ROM), programmable ROM (PROM), erasable PROM (EPROM), and electrically erasable PROM (EEPROM)), and other optional special purpose logic devices (e.g., application specific integrated circuits (ASICs)) or configurable logic devices (e.g., generic array of logic (GAL) or reprogrammable field programmable gate arrays (FPGAs)). The computer system 100 also includes plural input devices, such as a keyboard 122 and a mouse 124, and a display card 110 for controlling a monitor 120. In addition, the computer system 100 further includes a floppy disk drive 114; other removable media devices (e.g., a compact disc 119, a tape, and a removable magneto-optical media); and a hard disk 112, or other fixed, high density media drives, connected using an appropriate device bus (e.g., a small computer system interface (SCSI) bus, and enhanced integrated device electronics (IDE) bus, or an ultra-direct memory access (DMA) us). The computer system 100 may additionally include a compact disc reader 118, a compact disc reader-writer unit, or a compact disc juke box, each of which may be connected to the same device bus or another device bus. Although the compact disc 119 is shown in a CD caddy, the compact disc 119 can be inserted directly into CD-ROM drives which do not require caddies. In addition, a printer may provide printed listings of the data structure stored and/or generated by the computer system 100.

As stated above, the system includes at least one computer readable medium or memory programmed according to the teachings of the invention and for containing data structures, tables, records, or other data described herein. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user (e.g., a consumer). Such software may include, but is not limited to, device drivers, operating systems and user applications, such as development tools. Such computer readable media further includes the computer program product of the present invention for performing all or a portion (if processing is distributed) of the processing performed in implementing the invention. The computer code devices of the present invention can be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for determining polarization mode dispersion (PMD) of a grating, comprising:

generating two sequential optical beams of different frequencies;

exposing said grating to said two sequential optical beams; and determining a differential group delay of said two sequential optical beams based on a frequency dependence of a length of an optical path traveled by said two sequential optical beams in said grating.

2. The method of claim 1, wherein determining said differential group delay is based on a frequency dependence of the length of the optical path traveled in a dispersion conpensation grating (DCG).

3. The method of claim 2, wherein determining said differential group delay comprises determining a Jones matrix of the DCG.

4. The method of claim 3, wherein determining the Jones matrix of the DCG comprises determining Stokes parameters of the DCG.

5. The method of claim 3, wherein determining said differential group delay comprises determining the eigenvalues of the equation:

$$T(\omega+\Delta\omega) \cdot T^{-1}(\omega) - (1+i\ \phi'(\omega)\Delta\omega)I = 0,$$

where T is the Jones matrix of the DCG, $\omega$ is an optical beam frequency variable, $\Delta(\omega)$ is a frequency difference between said two sequential optical beams traveling through said DCG, I is the unit matrix, and $\phi'(\omega)$ is the partial derivative, with respect to $\omega$, of a phase component of a field output from the DCG, wherein $$\phi'(\omega) = \tau_g + \beta(\omega) \cdot \delta z(\omega)/\delta\omega,$$

the DCG where $\tau_g$ is a group delay due to PMD, $\beta(\omega)$ is the propagation constant of and z is a variable representing the traveled length of the optical path.

6. The method of claim 5, wherein determining said differential group delay, $\Delta\tau$, comprises calculating:

$$\Delta\tau = \text{Arg}(\rho_I/\rho_{II})/\Delta\omega - (\beta_I - \beta_{II}) \cdot \delta z(\omega)/\delta\omega,$$

where Arg denotes the argument function, $\rho_I$ and $\rho_{II}$ are the eigenvalues of $T(\omega+\Delta\omega) \cdot T^{-1}(c)$, and $\beta_I$ and $\beta_{II}$ are two propagation constants on the two principal axes of PMD.

7. The method of claim 6, wherein determining said differential group delay, $\Delta\tau$, comprises calculating:

$$\Delta\tau = \{\text{Arg}(\rho_I/\rho_{II})/\Delta\omega\}/(1-\lambda D\ c/2L_\lambda),$$

where $\lambda$ is an average optical beam wavelength, c is the speed of light, D is the dispersion value of the DCG, and $L_\lambda$ is a distance from the entrance of the DCG to a plane reflecting an optical beam of wavelength $\lambda$.

8. A system for determining the polarization mode dispersion (PMD) of a grating, comprising:

an optical source configured to generate two sequential optical beams having different frequencies;

a grating configured to receive said two sequential optical beams;

a detection mechanism configured to detect the polarization of said two sequential optical beams exiting said grating; and a processor configured determine a differential group delay of said two sequential optical beams based on a frequency dependence of a length of an optical path traveled by said two sequential optical beams in said grating.

9. The system of claim 8, wherein said grating comprises a dispersion compensation grating (DCG).

10. The system of claim 9, wherein said processor is configured to determine a Jones matrix of the DCG.

11. The system of claim 10, wherein said processor is configured to determine the eigenvalues of the equation:

$$T(\omega+\Delta\omega) \cdot T^{-1}(\omega) - (1+i\phi'(\omega)\Delta\omega)I = 0,$$

where T is the Jones matrix of the DCG, $\omega$ is an optical beam frequency variable, $\Delta(\omega)$ is a frequency difference between said two sequential optical beams traveling through said grating, I is the unit matrix, and $\phi'(\omega)$ is the partial derivative, with respect to $\omega$, of a phase component of a field output from the DCG, wherein $$\phi'(\omega) = \tau_g + \beta(\omega) \cdot \delta z(\omega)/\delta\omega,$$

where $\tau_g$ is a group delay due to PMD and $\beta(\omega)$ is the propagation constant of the DCG and z is a variable representing the length of the traveled optical path.

12. The system of claim 11, wherein said processor is configured to determine said differential group delay, $\Delta\tau$, by calculating:

$$\Delta\tau = \text{Arg}(\rho_I/\rho_{II})/\Delta\omega - (\beta_I - \beta_{II}) \cdot \delta z(\omega)/\delta\omega,$$

where Arg denotes the argument function, $\rho_I$ and $\rho_{II}$ are the eigenvalues of $T(\omega+\Delta\omega) \cdot T^{-1}(\omega)$, and $\beta_I$ and $\beta_{II}$ are two propagation constants on the two principal axes of PMD.

13. The system according to claim 12, wherein said processor is configured to determine said differential group delay, $\Delta\tau$, by calculating:

$$\Delta\tau = \{\text{Arg}(\rho_I/\rho_{II})/\Delta\omega\}/(1 - Dc/2L_\lambda),$$

where $\lambda$ is an average optical beam wavelength, c is the speed of light, D is the dispersion value of the DCG, and $L_\lambda$ is a distance from the entrance of the DCG to a plane reflecting an optical beam of wavelength $\lambda$.

14. A computer program product, comprising:

a computer storage medium and a computer program code mechanism embedded in the computer storage medium configured to cause a computer to determine a differential group delay of two sequential optical beams based on a frequency dependence of a length of an optical path traveled by said two sequential optical beams in a dispersion compensation grating (DCG).

15. The computer program product of claim 14, wherein said computer program code mechanism comprises a first computer code device configured to determine a Jones matrix of said DCG.

16. The computer program product of claim 15, wherein said computer program code mechanism further comprises a second computer code device configured to determine the eigenvalues of the equation:

$$T(\omega+\Delta\omega) \cdot T^{-1}(\omega) - (1+i\phi'(\omega)\Delta\omega)I = 0,$$

where T is the Jones matrix of the DCG, $\omega$ is an optical beam frequency variable, $\Delta(\omega)$ is a frequency difference between said two sequential optical beams traveling through said DCG, I is the unit matrix, and $\phi'(\omega)$ is the partial derivative, with respect to $\omega$, of a phase component of a field output from the DCG, wherein $$\phi'(\omega) = \tau_g + \beta(\omega) \cdot \delta z(\omega)/\delta\omega,$$

where $\tau_g$ is a group delay due to PMD, $\beta(\omega)$ is the propagation constant of the DCG and z is a variable representing the traveled length of the optical path.

17. The computer program product of claim 16, wherein said computer program code mechanism further comprises a third computer code device configured to calculate:

$$\Delta\tau = \text{Arg}(\rho_I/\rho_{II})/\Delta\omega - (\beta_I - \beta_{II}) \cdot \delta z(\omega)/\delta\omega,$$

where $\Delta\tau$ is the differential group delay of said two sequential optical beams, Arg denotes the argument function, $\rho_I$ and $\rho_{II}$ are the eigenvalues of $T(\omega+\Delta\omega) \cdot T^{-1}(\omega)$, and $\beta_I$ and $\beta_{II}$, are two propagation constants on the two principal axes of PMD.

18. The computer program product of claim 17, wherein said computer program code mechanism further comprises a fourth computer code device configured to calculate:

$$\Delta\tau = \{\text{Arg}(\rho_I/\rho_{II})/\Delta\omega\}/(1 - \lambda D c/2L_\lambda),$$

where $\lambda$ is the average optical beam wavelength, c is the speed of light, D is the dispersion value of the DCG, and $L_\lambda$ is a distance from the entrance of the DCG to a plane reflecting an optical beam of wavelength $\lambda$.

* * * * *